Apr. 24, 1923.  
E. H. SHERBONDY  
STEERING KNUCKLE FOR MOTOR VEHICLES  
Filed April 15, 1920  3 Sheets-Sheet 1

1,452,531

Inventor  
Earl H. Sherbondy

By Whittemore Hulbert & Whittemore  
Attorneys

Apr. 24, 1923.
E. H. SHERBONDY
STEERING KNUCKLE FOR MOTOR VEHICLES
Filed April 15, 1920     3 Sheets-Sheet 2
1,452,531
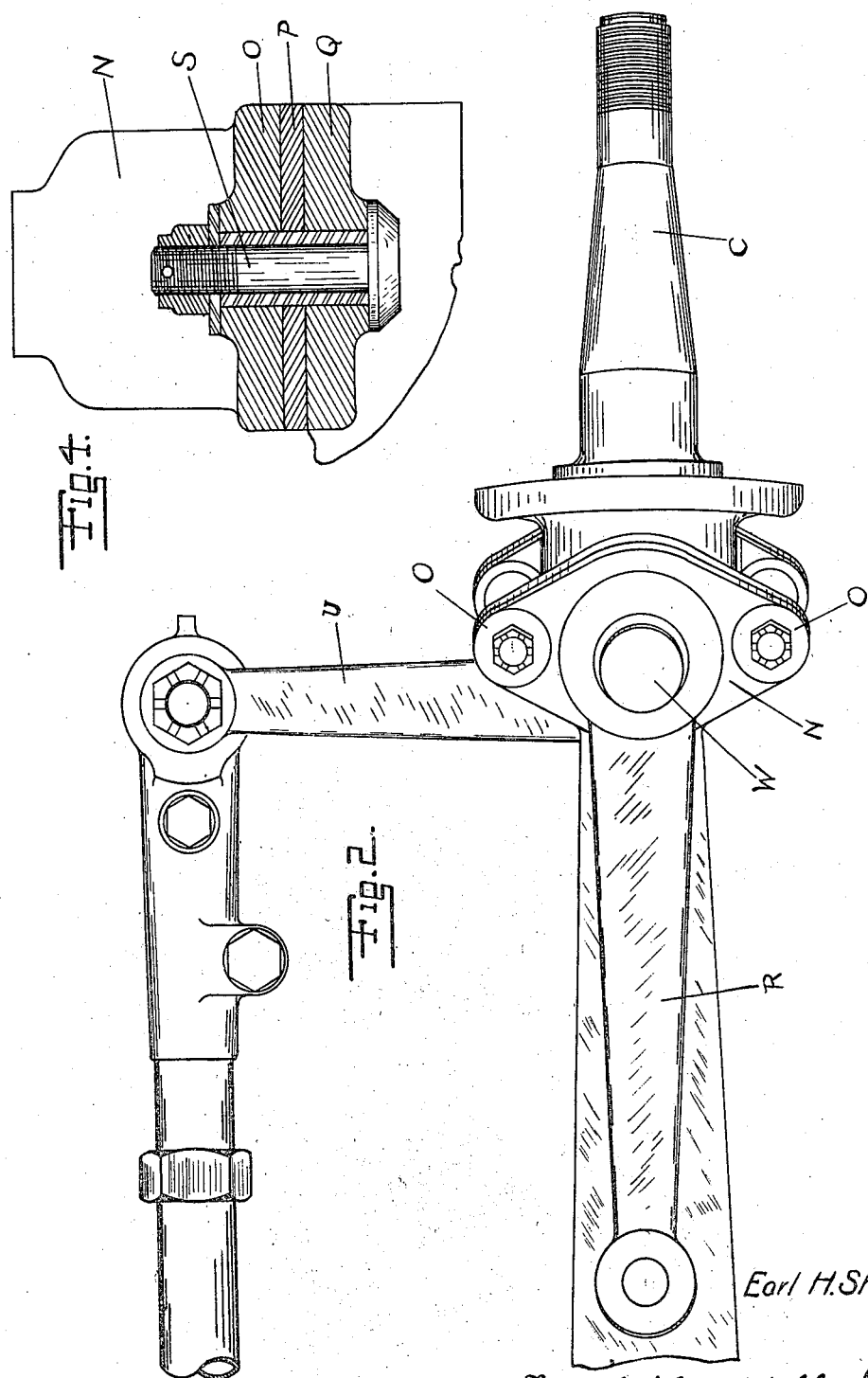
Inventor
Earl H. Sherbondy

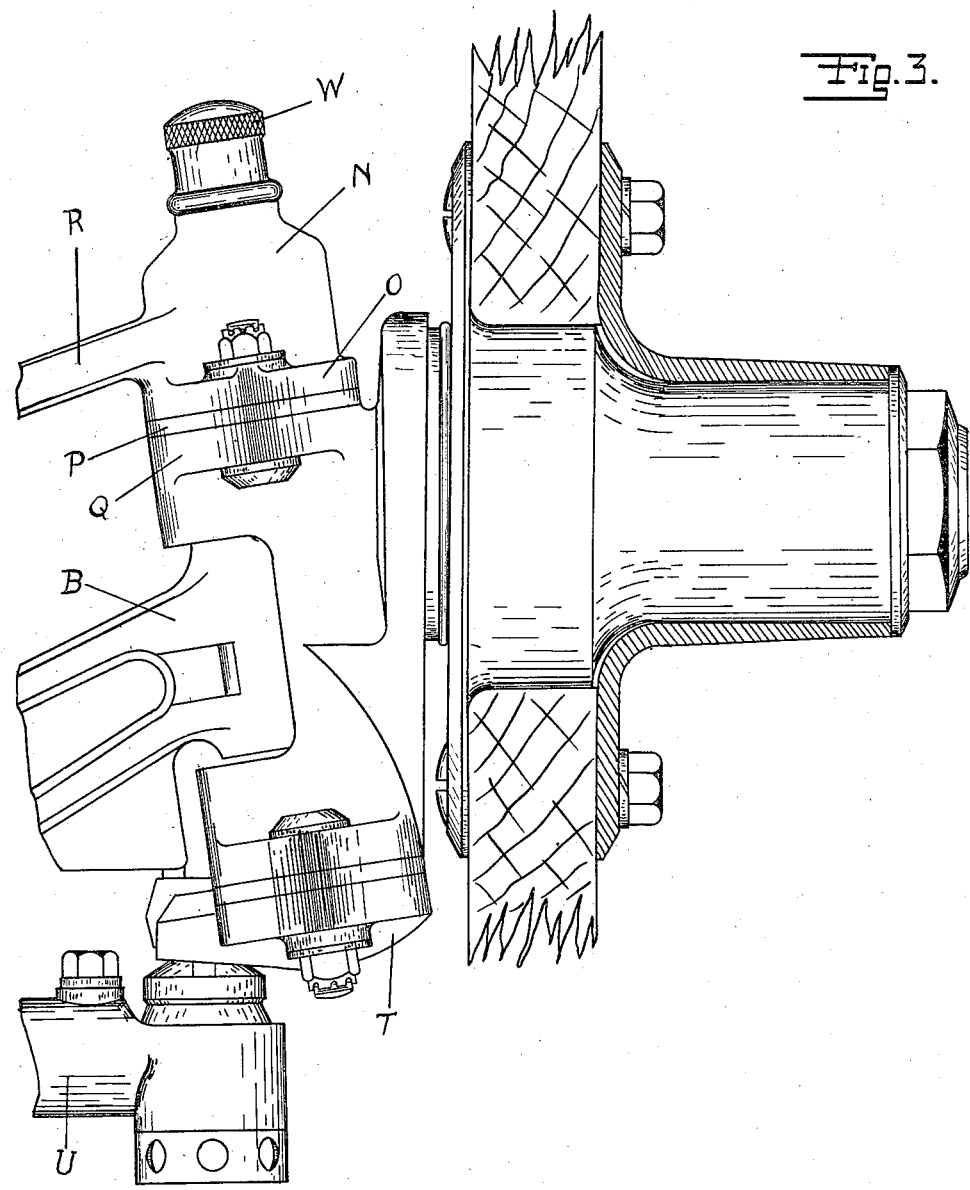

Patented Apr. 24, 1923.

1,452,531

UNITED STATES PATENT OFFICE.

EARL H. SHERBONDY, OF DETROIT, MICHIGAN, ASSIGNOR TO SIDNEY D. WALDON, OF DETROIT, MICHIGAN.

STEERING KNUCKLE FOR MOTOR VEHICLES.

Application filed April 15, 1920. Serial No. 374,047.

*To all whom it may concern:*

Be it known that I, EARL H. SHERBONDY, a citizen of the United States of America, residing at Detroit, in the county of Wayne and State of Michigan, have invented certain new and useful Improvements in Steering Knuckles for Motor Vehicles, of which the following is a specification, reference being had therein, to the accompanying drawings.

The invention relates to steering knuckles for motor vehicles and comprises various novel features of construction as hereinafter set forth.

In the drawings:

Figure 2 is a plan view thereof;

Figure 3 is a side elevation; and

Figure 4 is a cross-section in the plane of one of the clamping bolts.

Figure 1:
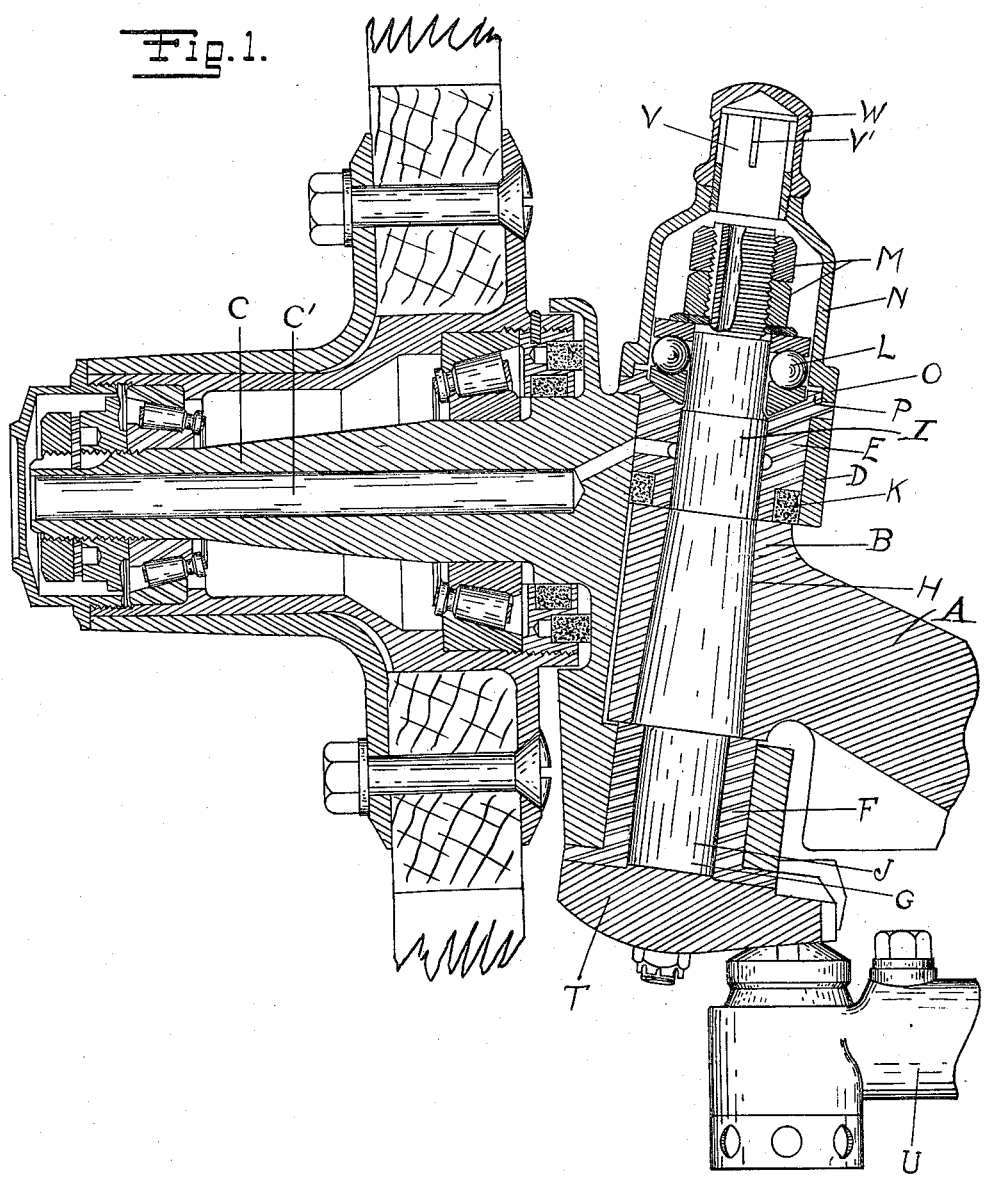
Figure 1 is a vertical section through the knuckle in the plane of the stub axle or spindle.

As shown, A is a stationary axle terminating in a bearing portion B, and C is a stub axle, which is formed with a bifurcation D for embracing the bearing B. To facilitate machining and assembling, this bifurcated member is first bored through one of the furcations thereof to a diameter such as to also form a segmental face in the recess between the furcations, whereby clearance is provided for the bearing B. A bushing E is introduced which reduces the internal diameter. The opposite furcation is bored to a smaller diameter and is provided with a bushing F. A pivot pin G is inserted through the furcation and through the intermediate bearing B. This pin is provided with a tapering portion H for engaging a correspondingly tapered aperture in the bearing B and on opposite sides of the tapered portion H are cylindrical portions I and J for respectively engaging the bushings E and F. K are packing rings which engage annular recesses at the inner ends of the bushings E and F and which bear against the opposite faces of the bearing B to form an oil tight joint therewith. L is an end thrust bearing arranged above the bushing E and carrying the load upon the axle, which is transmitted through the tapering pin into the upper furcation of the member D. The bearing L is secured by suitable lock nuts M engaging a threaded upper end of the pin G.

For attachment of the operating rock arms to the stub axle and for also housing the moving parts in an oil proof, oil-tight and dust-proof case, I have provided the following construction:

N is a cap member arranged above the bushing E and enclosing the thrust bearing L and lock nuts M. This cap is formed with diametrically oppositely extending ears O, which register with corresponding ears P upon the bushing E and ears Q upon the bifurcated member D. The cap N on the knuckle on one side of the car is also provided with a rock arm R, which forms a connection to the steering mechanism. The registering ears O, P and Q are secured to each other by bolts S, which transmit the torque from one to the other and which also clamp the cap in position so as to form the oil-tight and dust-proof housing. The bushing F in the lower furcation is similarly provided with ears which register with ears on said furcation and upon a lower cap member T, while the latter is formed integral with a rock arm U for connection to the cross rod of the steering mechanism.

To provide for conveniently lubricating the bearing L, the cap member N is secured thereto by an upwardly extending tube V, which is closed by a cap W frictionally held in position. The tube V is preferably slitted at its upper end, as indicated at V', so that it is slightly compressed when the cap is placed thereon, the tension increasing the friction and preventing displacement. By means of this tube the chamber within the cap N may be completely filled with lubricant and this may also be used for lubricating the stub axle by means of a passage through the bushing E and member D into an axial bore C' of said axle. Thus, the lubricant can pass to the outer end of the stub axle and around said end to the bearings.

As a result of this construction a steering knuckle is obtained of great rigidity which is readily machined because of the peculiar construction which permits of the introduction of the boring tool entirely through one of the furcations and into the recess between the furcations to give proper clearance for the embraced stationary end portion of the axle. Furthermore the seating of the bushing with the flange as indicated in the upper bifurcation permits direct transmission of the weight from the pin into the stub axle, the thrust bearing and nut forming ready means for thus suspending the pivot pin in the bushing.

What I claim as my invention is:

1. In a steering knuckle for vehicle axles, a steering axle bearing, a stub axle provided with a bifurcated pivot bearing embracing the steering bearing, ears on said furcations, a pivot pin connecting the bearings, a cap housing the pivot pin and having ears in registration with the ears on the furcations, means for rigidly securing said ears to each other, and a rock arm integral with said cap member.

2. In a steering knuckle for vehicle axles, the combination with a stub axle, of a bifurcated pivot bearing integral with said axle, a stationary bearing embraced by the furcations of said bifurcated bearing, a pivot pin for connecting said bifurcated bearing and stationary bearing, a bushing secured in the bifurcated bearing, a thrust bearing on the pivot pin suspending the latter in the bushing through the arm in which the pin is journaled, a cap housing the thrust bearings and adjacent portions of the pin, a rock arm integral with said cap and registering ears on said cap and adjacent furcation connected to each other for transmitting the torque from one to the other.

3. In a steering knuckle for vehicle axles, the combination with a stub axle having a bifurcated pivot bearing thereon, an axle having a bearing embraced by the stub axle pivot bearing, a pivot pin connecting the assembled bearings, a cap housing for the pivot pin, an ear rigidly connected to the cap and an ear on the adjacent furcations of the pivot bearing in registration with and fixedly secured to the ear connected with the cap.

4. In a steering knuckle for vehicle axles, the combination with a stub axle having a bifurcated pivot bearing thereon, an axle having a bearing embraced by the stub axle pivot bearing, a pivot pin connecting the bearings, a cap housing for the pivot pin, ears rigidly connected to said cap and adjacent furcations respectively, and a bushing member provided with an ear interposed between the aforesaid ears, and means for rigidly securing all of said ears together.

In testimony whereof I affix my signature.

EARL H. SHERBONDY.